United States Patent
Rathor

(10) Patent No.: US 11,288,244 B2
(45) Date of Patent: Mar. 29, 2022

(54) TREE DEDUPLICATION

(71) Applicant: Akamai Technologies Inc., Cambridge, MA (US)

(72) Inventor: Monika Rathor, Sunnyvale, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 185 days.

(21) Appl. No.: 16/436,257

(22) Filed: Jun. 10, 2019

(65) Prior Publication Data

US 2020/0387484 A1     Dec. 10, 2020

(51) Int. Cl.
| | | |
|---|---|---|
| *G06F 16/215* | (2019.01) | |
| *G06F 16/23* | (2019.01) | |
| *G06F 16/22* | (2019.01) | |

(52) U.S. Cl.
CPC ........ *G06F 16/215* (2019.01); *G06F 16/2246* (2019.01); *G06F 16/2365* (2019.01)

(58) Field of Classification Search
USPC ....................................................... 707/692
See application file for complete search history.

(56) References Cited

U.S. PATENT DOCUMENTS

| | | | |
|---|---|---|---|
| 5,873,078 A | 2/1999 | Angle et al. | |
| 6,192,051 B1 * | 2/2001 | Lipman | H04L 45/742 370/389 |
| 6,233,574 B1 * | 5/2001 | Ladwig | G06F 16/9027 707/741 |
| 6,396,842 B1 * | 5/2002 | Rochberger | H04L 45/02 370/255 |
| 6,546,391 B1 * | 4/2003 | Tsuruoka | H04L 29/12009 |
| 6,594,655 B2 | 7/2003 | Tal et al. | |
| 6,662,184 B1 * | 12/2003 | Friedberg | G06F 16/322 707/754 |
| 7,349,415 B2 * | 3/2008 | Rangarajan | H04L 45/00 370/408 |
| 8,200,686 B2 * | 6/2012 | Rhoades | G06F 30/327 707/764 |
| 8,806,058 B1 * | 8/2014 | Mackie | H04L 45/00 709/238 |

(Continued)

OTHER PUBLICATIONS

Sklower, Keith, A Tree-Based Packet Routing Table for Berkeley Unix, downloaded Apr. 18, 2019 from http://people.eecs.berkeley.edu/~sklower/routing.pdf 15 pages.

(Continued)

*Primary Examiner* — Cam Linh T Nguyen

(57) ABSTRACT

Radix trees and other trees use memory inefficiently when storing key-value associations with 'or' conditions. Their function can be optimized by using multiple key field trees, each corresponding to a key field, which is typically a character (or group thereof) in a string input key. The tree for the final key field has nodes with the output values, and these are annotated to identify, for each output value, the valid key field values from prior key fields. To execute a lookup, each key field tree is traversed to find a matching key field value. The final key field tree is traversed to reach one or more output values; then the previously determined key field values are compared against the valid key field values to determine if there is a match for a particular output value. The matched and valid key field values can be expressed in encoded form.

12 Claims, 13 Drawing Sheets

(56) References Cited

U.S. PATENT DOCUMENTS

| | | | |
|---|---|---|---|
| 9,654,579 B2 | 5/2017 | Stevens et al. | |
| 9,667,747 B2 | 5/2017 | Shotton et al. | |
| 9,736,271 B2 | 8/2017 | Janardhan et al. | |
| 9,942,363 B2 | 4/2018 | Stevens et al. | |
| 10,237,363 B2 | 3/2019 | Stevens et al. | |
| 10,237,374 B2 | 3/2019 | Stevens et al. | |
| 10,257,318 B2 | 4/2019 | Stevens et al. | |
| 10,482,175 B2* | 11/2019 | Rosewell | G06F 16/325 |
| 2002/0083033 A1* | 6/2002 | Abdo | G06F 16/30 |
| 2004/0210588 A1* | 10/2004 | Simkins | H04L 61/604 |
| 2006/0020638 A1* | 1/2006 | Shadmon | G06F 16/322 |
| 2012/0179689 A1* | 7/2012 | Hornkvist | G06F 3/067 |
| | | | 707/742 |
| 2015/0324384 A1* | 11/2015 | Tsirkin | G06F 16/00 |
| | | | 707/693 |
| 2015/0324484 A1* | 11/2015 | Tsirkin | G06F 16/9027 |
| | | | 707/693 |
| 2015/0324485 A1* | 11/2015 | Tsirkin | G06F 16/9027 |
| | | | 707/769 |
| 2017/0255670 A1* | 9/2017 | Lei | H03M 7/3097 |
| 2018/0039662 A1* | 2/2018 | Asai | G06F 16/2246 |
| 2018/0225321 A1* | 8/2018 | Boles | G06F 16/9027 |
| 2019/0188311 A1* | 6/2019 | Pounds | G06F 16/2465 |
| 2019/0222504 A1* | 7/2019 | Kananda | H04L 45/64 |
| 2019/0222514 A1* | 7/2019 | Nimmagadda | H04L 45/22 |
| 2019/0280969 A1* | 9/2019 | Liu | H04L 45/48 |
| 2020/0110821 A1* | 4/2020 | Chan | G06F 16/2379 |
| 2020/0117728 A1* | 4/2020 | Tomlinson | G06F 7/14 |

OTHER PUBLICATIONS

Wikipedia, Radix Tree, downloaded on May 22, 2019, 8 pages. https://en.wikipedia.org/wiki/Radix_tree.

* cited by examiner

TREE DEDUPLICATION

BACKGROUND

Technical Field

This application relates generally to the use and optimization of data structures and more particularly to the use and optimization of trees (tries), including radix trees, that store key-value associations.

Brief Description of the Related Art

Trees (tries) are a known type of data structure. They can be used in applications that involve a lot of searching. Radix trees are an optimized version of trees and like trees they are often used to store associative arrays (key-value pairs). The keys can be strings, or numbers. Radix trees can be used in search applications such as auto-complete, text search, IP blacklisting and whitelisting, and IP routing, for example.

FIG. 1 proves an example of a radix tree as known in the art. This radix tree stores several strings as shown on the left, which are the keys. Each key is associated with an output value, in this case an integer 1 to 7. To search the tree for a given input key (string), the computer walks the nodes evaluating each character or group of characters in the key at a time, eventually arriving at a node with an output value if the key is present (if the string is not present, then there is no match—the key is not stored in the tree—and no value is returned).

While radix trees can support fast lookup operations and have many other advantages, in some situations a radix tree becomes quite large and uses too much memory, which is a problem for memory critical/constrained applications. For example, consider a situation where the set of keys has a high degree of overlap. This is shown visually by the table below, where there are three fields and the '|' character implies OR:

| KEY FIELD 1 | KEY FIELD 2 | KEY FIELD 3 | VALUE |
| --- | --- | --- | --- |
| A | D\|E\|F | G | 91 |
| B\|C | D\|E\|F | G | 92 |
| A | E\|F | H | 93 |
| B\|C | D\|E\|F | H | 94 |

A corresponding radix tree for the above set of keys would appear as shown in FIG. 2. The redundancy in a portion of the key data, namely key field 3, causes there to be a large number of duplicative nodes. Because each node consumes some amount of memory, this results in wasted memory space.

It would be desirable to optimize a radix tree by eliminating or at least reducing the number of duplicative nodes, without losing data fidelity or affecting the search capabilities provided by the radix tree. It is an object of this patent document to describe systems, methods and devices to meet this need.

It should be understood by those skilled in the art that a radix tree is an optimized form of a tree (also referred to as a trie). The teachings hereof apply equivalently to trees/tries other than radix trees.

The teachings presented herein improve the functioning of a computer itself, by making its memory use more efficient. Those skilled in the art will understand these and other improvements from the teachings hereof.

BRIEF DESCRIPTION OF THE DRAWINGS

The invention will be more fully understood from the following detailed description taken in conjunction with the accompanying drawings, in which.

Figure 1:
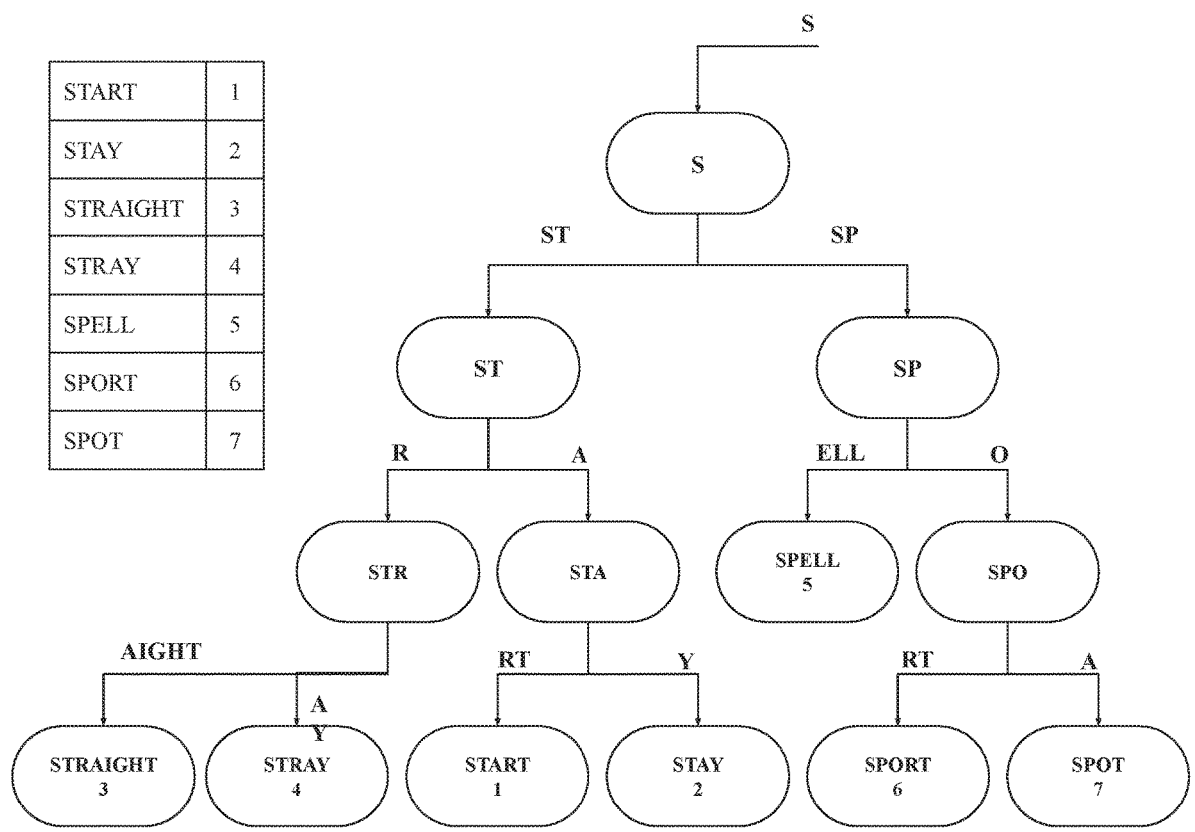
FIG. 1 is a diagram illustrating a radix tree as known in the prior art.

Numerical labels are provided in some FIGURES solely to assist in identifying components being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, HTTP over QUIC, MQTT, TCP/IP, and UDP, is assumed. All references to HTTP should be interpreted to include an embodiment using encryption (HTTP/S), such as when TLS secured connections are established. The terms "client" and "client device" are used herein to refer to hardware in combination with software (e.g., a browser or player application). While context may indicate the hardware or the software exclusively, should such distinction be appropriate, the teachings hereof can be implemented in any combination of hardware and software. Hardware may be actual or virtualized.

Overview

In some situations a tree, such as a radix tree, can use memory inefficiently. According to the teachings hereof, the function of the tree can be optimized and address the problem of duplicative nodes by storing the set of keys (which would have been stored in the radix tree) in multiple trees, e.g., one for each key field. Such trees are referred to below as 'key field trees'. Each key field tree, except the last, can be traversed during a lookup to find a matching key field value and preferably an encoded identifier for that value. This encoded identifier can be done using a lightweight way of representing the matched value, e.g., a bit set in a bit array, or otherwise. Put another way, terminal nodes of the key field tree can be associated with an encoded identifier of the key field value; this encoded identifier signifies what value matched in the tree for the particular portion of the key represented by the key field. (The name "terminal node" is meant to refer to leaf nodes or to other nodes, such as intermediate nodes, that are associated with a matching key field value.)

The key field tree for the last part of the key is treated slightly differently. The nodes of the last key field tree can be associated with an output value. The output value is the ultimate value that the tree stores for a given input key (i.e., the 91, 92, 93, or 94, in FIG. 2). For each output value there is a designation of the valid key field values from the prior key fields. Hence, nodes of the last key field tree contain {output value, valid values of key field for key field 1, valid values of key field for key field 2 . . . valid values of key field for key field N−1}, where N is the next to last key field. Analogous to the key field values in prior key field trees, the designation of valid key field values can be expressed in an encoded form, e.g., with bitmasks. Hence, the nodes of the last key field tree can contain {output value, bitmask for valid bits for key field 1, bitmask for valid bit for key field 2 . . . bitmask for valid bits for key field N−1}.

As suggested above, in one embodiment, the key field values can be expressed as encoded identifiers, in the form of bits set in a bit array. Any other representation could be used; the term "encoded" is merely used to distinguish the encoded identifier of a value from the value itself. Also, in the last key field tree, the designation of the valid key field values can be in encoded form, such as a bitmask, but this is merely one representation. In other embodiments, the encoded identifiers could be integers, or strings, or characters, or anything that uniquely identifies a value.

Example of Key Field Trees

Figure 2:
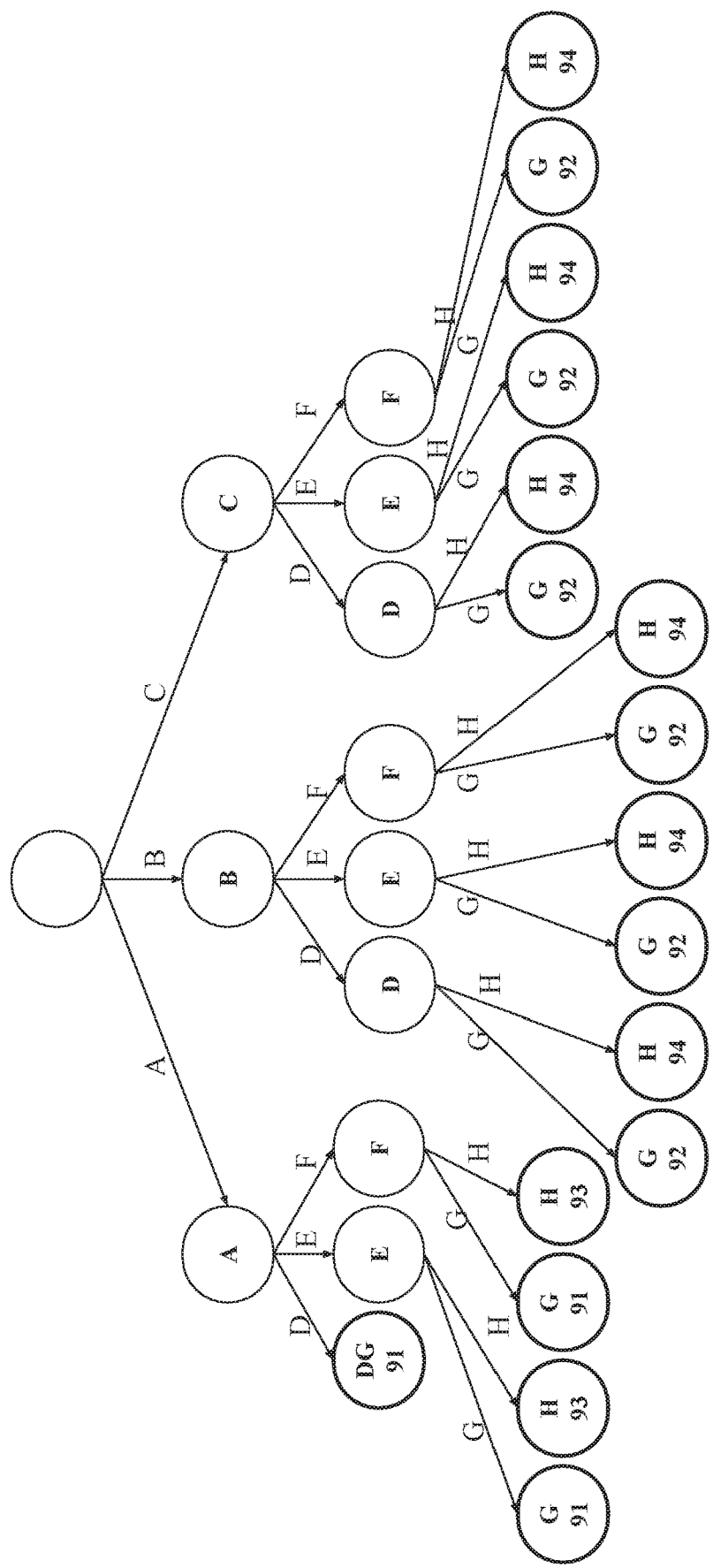
FIG. 2 is a prior art radix tree storing a key value associations for several strings and associated integer values, and illustrating the prior art's inefficient and wasteful use of memory by a radix tree in certain applications.

By way of example, let us create a data structure made up of a set of key field trees representing the data (i.e., the set of keys) that was stored in the radix tree shown in FIG. 2. The boundaries of the key fields are defined by the nature of the input keys stored in the trees and the appropriate delimiters. For strings, each character or group of characters can be treated as its own field. Recall the data set for the radix tree in FIG. 2 was:

| KEY FIELD 1 | KEY FIELD 2 | KEY FIELD 3 | VALUE |
| --- | --- | --- | --- |
| A | D\|E\|F | G | 91 |
| B\|C | D\|E\|F | G | 92 |
| A | E\|F | H | 93 |
| B\|C | D\|E\|F | H | 94 |

Figure 3:
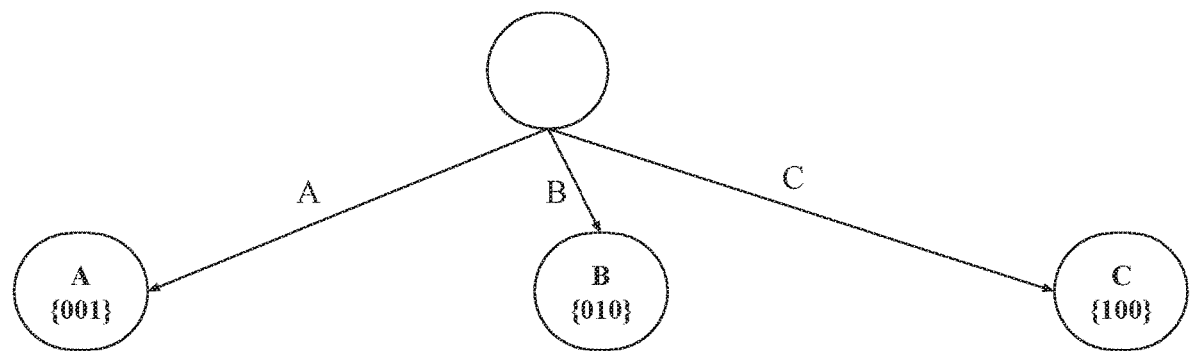
FIG. 3 is a tree for key field 1 of an improved data structure for storing the same set of keys that was stored in the radix tree of FIG. 2.

For this set of data, the first key field tree is shown in FIG. 3. In FIG. 3, the possible values of leaf nodes are designated as A=1, B=2, C=3. These key field values are encoded into identifiers. The encoded identifiers here are a single bit set in a positional bit array, where A=001, B=010, and C=100. This will be used later in finding the final output value.

Figure 4:
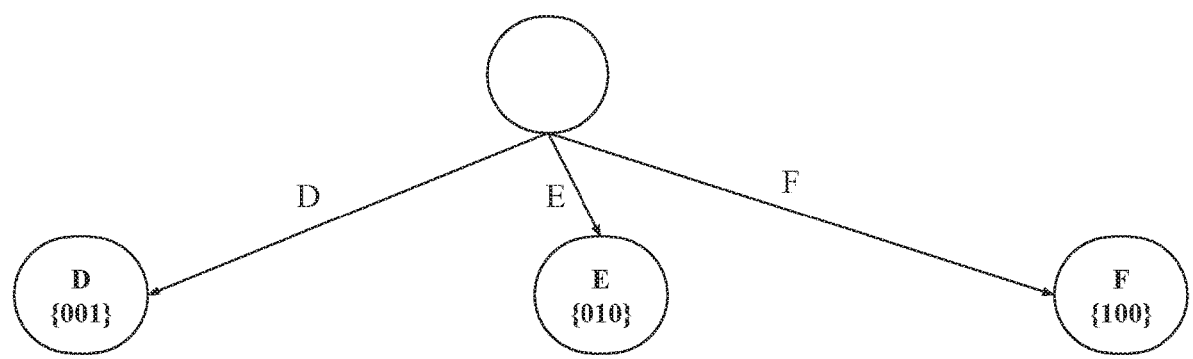
FIG. 4 is a tree for key field 2 of an improved data structure for storing the same set of keys that was stored in the radix tree of FIG. 2.

The second key field tree is shown in FIG. 4. Here, the possible values of leaf nodes are D=1, E=2; F=3. These values are encoded into identifiers using a single bit in a bit array, where D=001, E=010, and F=100.

Figure 5A:
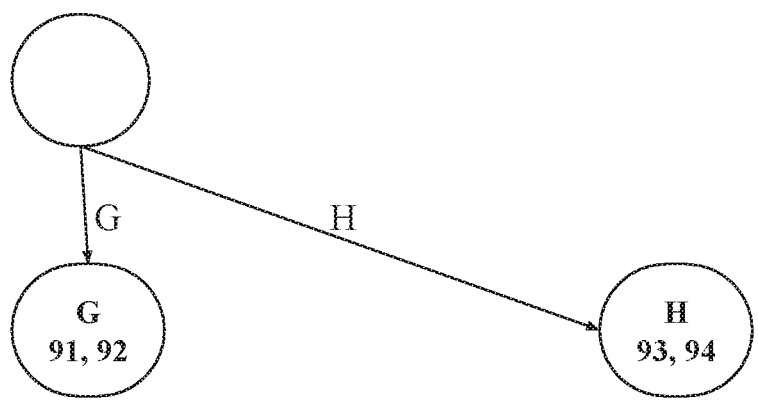
FIG. 5A is a tree for the last key field of an improved data structure for storing the same set of keys that was stored in the radix tree of FIG. 2.

The third key field tree is shown in FIG. 5A. Here, the possible key field values with leaf nodes are G and F. G and H are each associated with multiple output values, as follows:
G→{91, 92}
H→{93, 94}

Figure 5B:
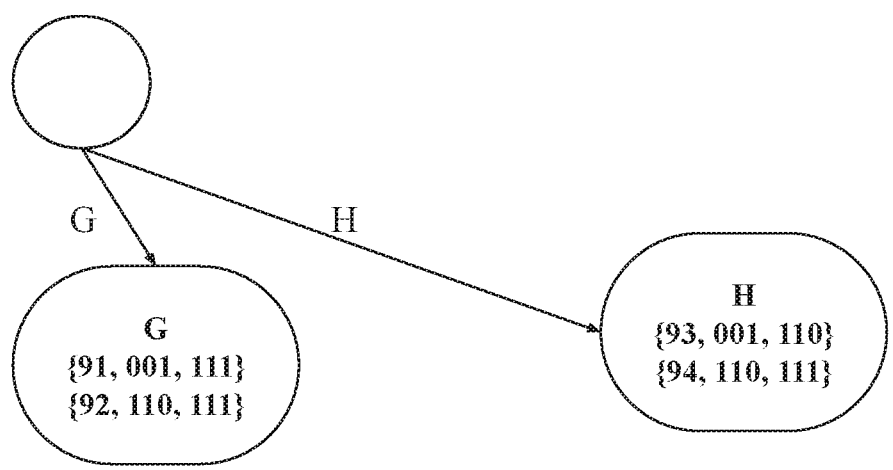
FIG. 5B is a tree for the last key field of an improved data structure for storing the same set of keys that was stored in the radix tree of FIG. 2; with annotations for the final integer values, the annotations being key field identifiers in the form of bitmasks.

Turning to FIG. 5B, the third key field tree is further annotated to associate each of the output values (e.g., 91, 92, 93, 94) with a designation of value key field values from prior trees. In this case the designation is encoded in the form of a bitmask that identifies all possible valid bits from the other key field trees; this referred to below as a "validity bitmask" for brevity. Using such validity bitmasks, each output value is associated with {output value, valid bits for key field 1, valid bits for key field 2}.

Lets calculate the bitmasks for G→91. From our input table above, the first key field valid for G→91 is 'A'. The corresponding identifier for A in the first key field radix tree is 1, that means one sets the validity bitmask for the first key field as 001. The values of the second field applicable to G→91 are (D|E|F). Hence the validity bitmask for field 2 is 111. As a result, the validity bitmasks for G→91 are G→{91, 001, 111}.

Following the same approach for G→92, G→93 and G→94, one arrives at e following annotated forms for the final output values:

| | |
|---|---|
| G → {91, 001, 111} | \\ as explained above |
| G → {92, 110, 111} | \\ this is because the valid key field values for 92 are B or C (for \\ the first key field) and D or E or F (for the second key field) |
| H → {93, 001, 110} | \\ this is because the valid key field values for 93 are A (for the \\ first key field) and E or F (for the second key field) |
| H → {94, 110, 111} | \\ this is because the valid key field values for 94 are B or C (for \\ the first key field) and D or E or F (for the second key field) |

As noted above, the final form of the third key field tree is shown in FIG. 5B, with the validity bitmasks added.

Of course, in other embodiments, the use of validity bitmasks could be replaced by other things. For example, the final form for G→91 could be:

| | |
|---|---|
| G → {91, {A}, {D,E,F}} | \\ designating valid values of prior key fields for G and \\ output value 91 |

Looking back, the radix tree shown in FIG. 2 required 29 nodes to store the data set (including the root node). The three trees in FIGS. 3, 4, and 5B—which store the same data as in the radix tree, and support the same key-value lookup operations—require only 11 nodes (including the root nodes for each tree).

Lookup Example 1

Let us walk through a lookup algorithm to match some valid and invalid inputs against the three trees shown in FIGS. 3, 4, 5B.

Assume that the input key is the string AEH. In this case, the three characters are each a key field. There are three trees for us to match. If at any stage (for any tree) the attempted match fails it can be considered no match and no need to find matches for remaining key fields.

The first character 'A' is found in the FIG. 3 key field tree, which leads us to the first encoded identifier of 001 (value of A is 1 that means first bit is set). The second character is 'E', which is found in the FIG. 4 key field tree and gives us a bit array of 010. And the third character is 'H', which is associated with two output values, each with two validity bitmasks:

H→{93, 001, 110}
H→{94, 110, 111}

Given the previously-determined bits set as {001 010} from the lookups of the earlier values for the first and second key fields, respectively, the algorithm now searches amongst output values for H to determine whether any of those output values indicate that {001 010} are a valid set of values from earlier key fields. That output value here is 93, since bit 001 for the first key field is valid (first bit valid against validity bitmask 001), and for the second key field bit 010 is valid (second bit matches against validity bitmask 110).

Lookup Example 2

Now let us walk the algorithm when there is no match. Assume the input is the string ADH. This path does not exist in the radix tree. The first character is A which yields a bit array of 001 from the FIG. 3 key field tree. The second character is which yields a bit array of 001 from the FIG. 4 key field tree. Turning to the final character and the final key field tree in FIG. 5B, looking up H yields

H→{93, 001, 110}
H→{94, 110; 111}

Neither of the bitmask sets supported by H's values accept 001, 001 as the input bitmasks from the earlier key field trees. Put another way, neither have '1' at the first place of both the values (this fact is highlighted by the bolding in the validity bitmasks). This means there is no match; ADH is an invalid input. It also essentially means that there was no way of reaching H→93 or H→94 in the original radix tree (FIG. 2) with ADH. Hence, no value would be returned.

Exemplary Application to Policy Lookup Based on Content Request Fields

One (non-limiting) application for the teachings hereof involves looking up a policy identifier (e.g., an integer value) based on an input string that represents a URL, or portion thereof. The key is the input string; the output value is the policy identifier.

To provide some context for this use-case: as is known in the field of content delivery networks and related fields, a content request issued from a client to a server often needs to be associated with a policy defining parameters around how to handle that request. This is particularly but not exclusively the case in multi-tenant systems, where the incoming request may be directed to a given tenant's website, web application, or other digital property.

Let's take an example of policy lookup that benefits from the new approach. The desired lookup logic can be represented as shown below:

HTTP method:hostname:URL path→policy identifier

In other words, for a given URL method, hostname, and URL path combination, we want to lookup the corresponding policy identifier. Of course, there may be multiple URL methods, hostname, and URL paths that can match against a given policy, leading to 'or' conditions. Let us look at a specific example:

delete|patch|put|get:app.mobile.example.com|prod.example.app|test.example.app:/api/foo/bar/user/account/addresses →51605 patch|put|getapp.mobile.example.com|prod.example.app|test.example.app:/n1/foo/bar/user/account/addresses →51606

Each logical section is separated by the delimiter ':'. The character '|' represents OR condition. For just one value (policy identifier of 51605) there will be duplication of URL path/api/foo/bar/user/account/addresses. Specifically, for each HTTP method delete|patch|put|get and each hostname app.mobile.example.com|prod.example.app|test.example.app, there will be an entry of the URL path leading to policy identifier 51605. Hence, the problem of duplicative nodes first illustrated above in FIG. 2 exists here as well.

Figure 6A:
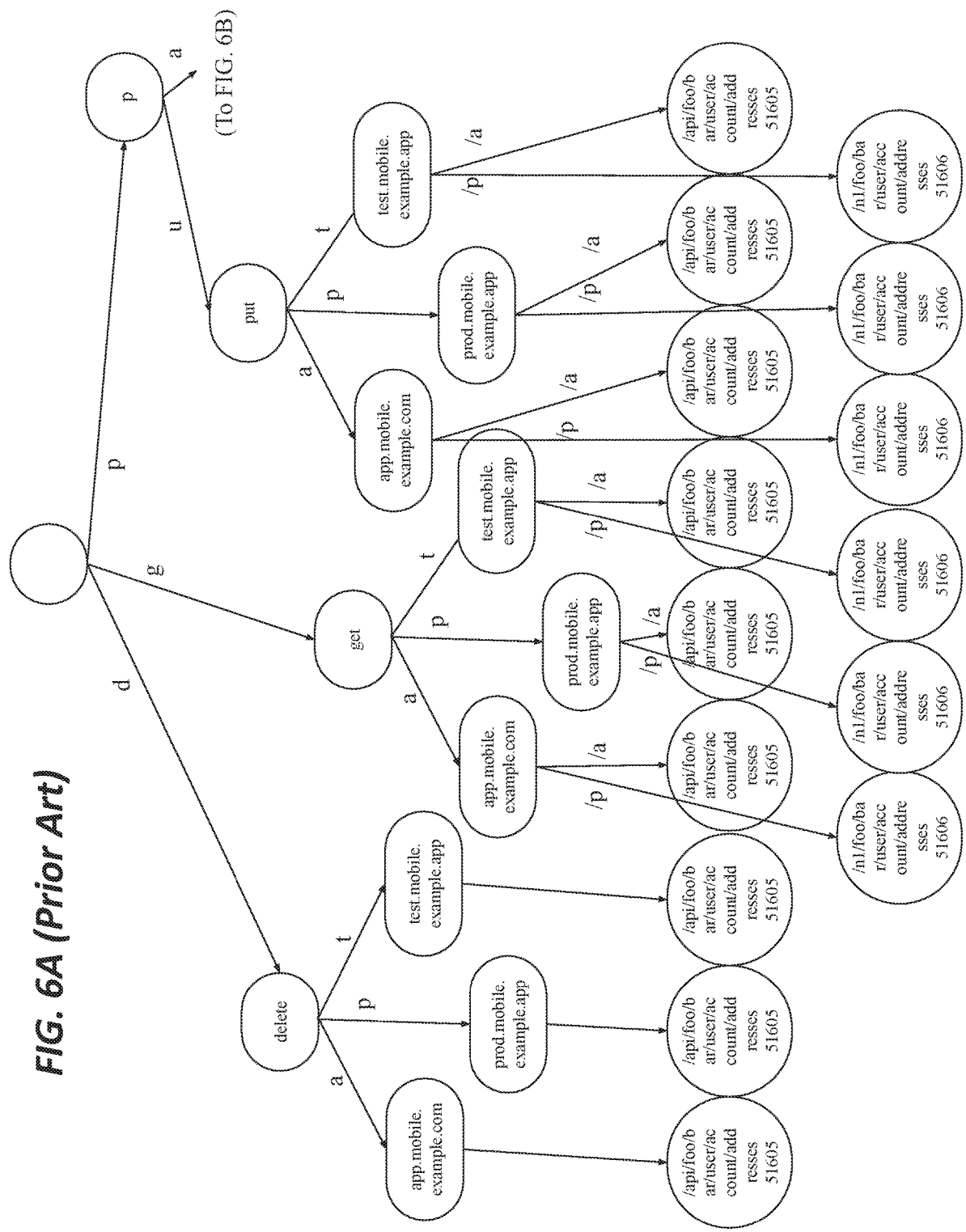
FIGS. 6A and 6B show a prior art radix tree for storing a set of keys related to a HTTP request method, hostname, and URL path.
Figure 6B:
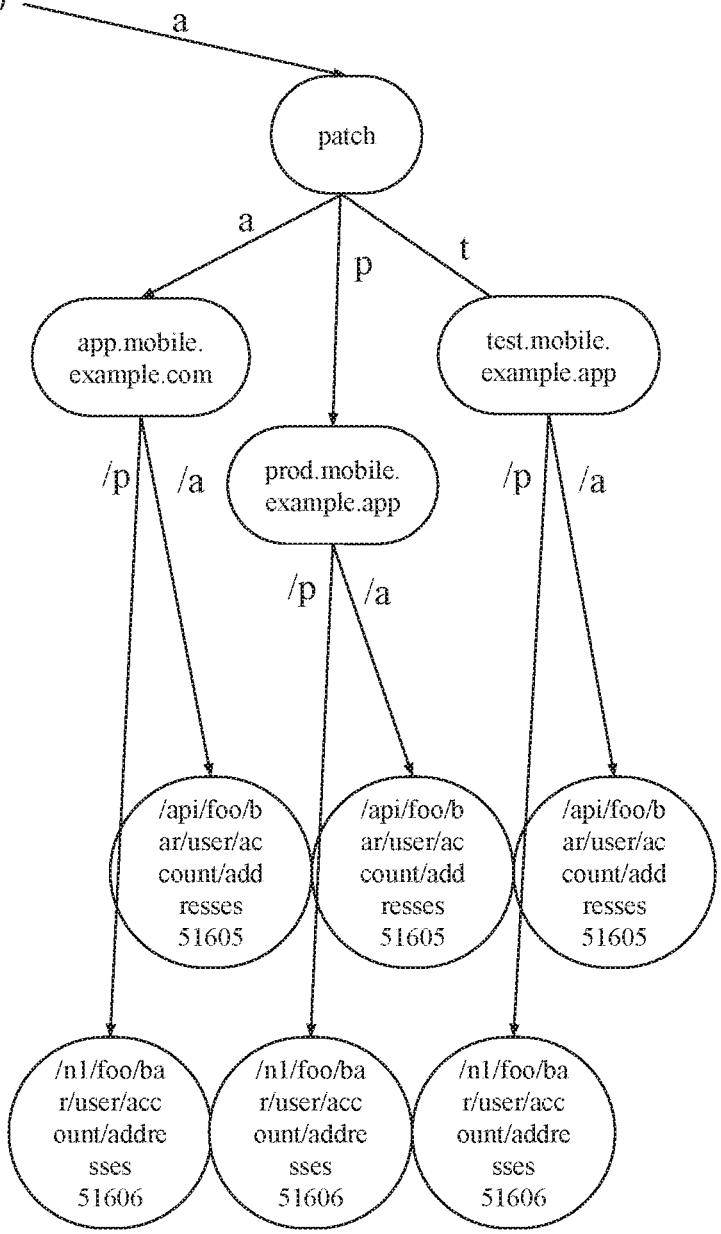

The data set above can be represented in a Radix tree according to the prior art as shown in FIG. 6A-6B, with the diagram form FIG. 6A continuing onto FIG. 6B. As was the case with FIG. 2, many nodes are duplicated.

Figure 7:
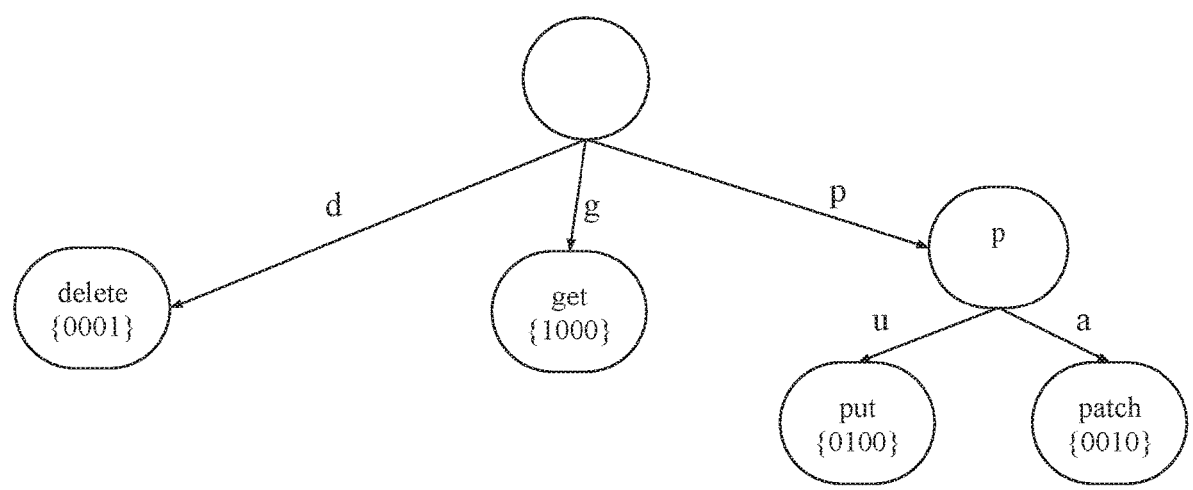
FIG. 7 is a tree for key field 1 of an improved data structure for storing a set of keys related to a HTTP request method, hostname, and URL path.
Figure 8:
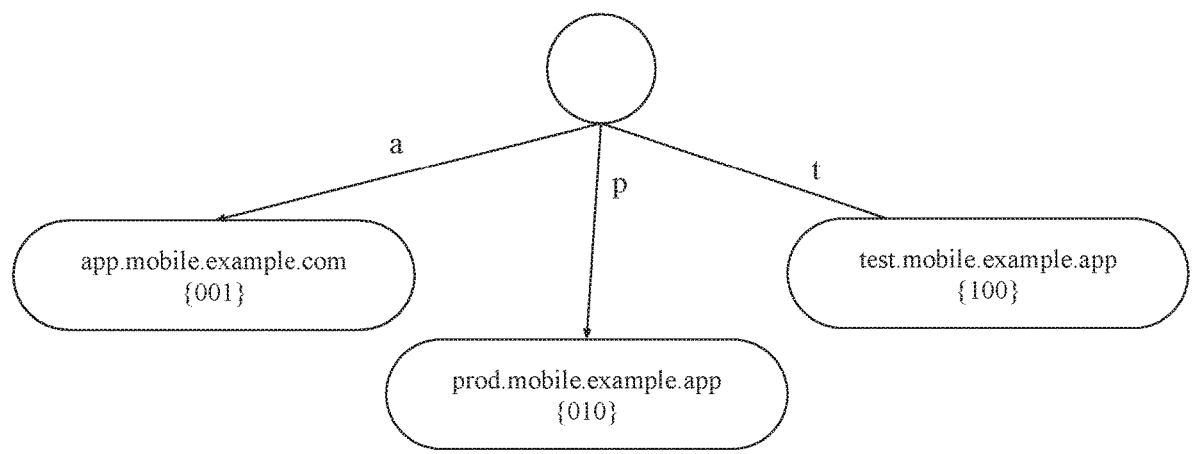
FIG. 8 is a tree for key field 2 of an improved data structure for storing a set of keys related to a HTTP request method, hostname, and URI, path.
Figure 9:
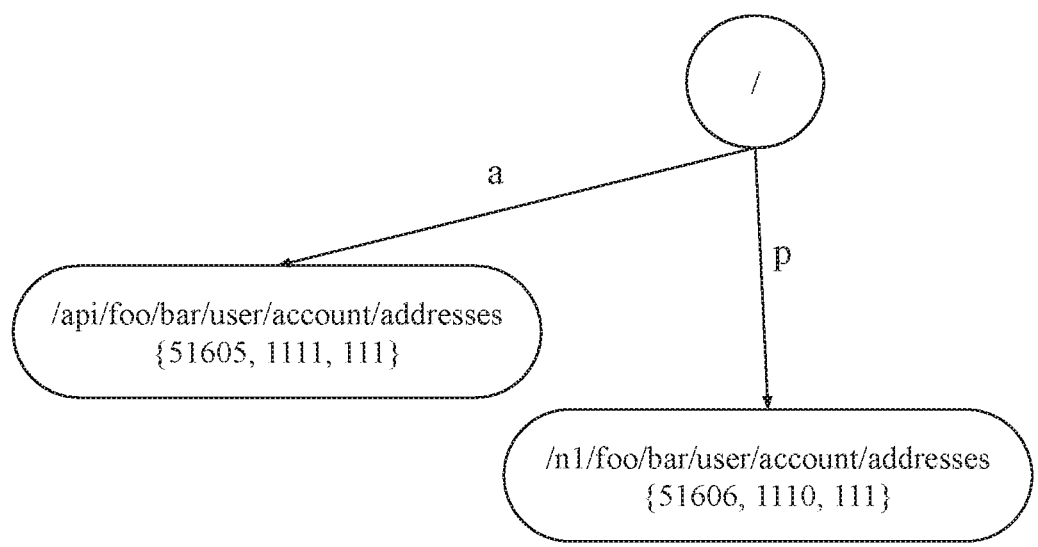
FIG. 9 is a tree for the last key field of an improved data structure for storing a set of keys related to a HTTP request method, hostname, and URL path.

Now, the data set can be represented in a data structure using the approach taught in this patent document; this is shown in FIGS. 7, 8, 9, where FIG. 7 illustrates the key field tree for key field of the HTTP method, FIG. 8 illustrates the key field tree for the key field of the hostname, and FIG. 9 illustrates the final key field tree for the key field of the URL path.

An example of a lookup is now provided. Assume an input of an HTTP Get for hostname test.example.app and URL path/api/foo/bar/user/account/addresses. This input key results in a first key field tree returning a bit array of 1000 (for the "get") and a second key field tree returning a bit array of 0100 (for the hostname test.example.app for FIGS. 7 and 8, respectively). The final key field tree in FIG. 9 yields integer 51605. This number identifies a particular policy stored in a server. In sum, upon receiving a client HTTP request with a specified {HTTP method, hostname, URL}, the server an look up the policy number in the modified radix trees represented according to the teachings of this document, and then locate the applicable request handling policy.

If any of the tree lookups failed to find a match (either for a key field identifier or for a final output value), then the output would be null, i.e., the key was not found in the data structure.

Generalizing the above example, a client request issued over a computer network can be an input key of the form:
<protocol>:<domain>:<URL path>:<query param>:<http headers>

A key field tree can be generated for each group delimited by the semicolons, e.g., with the values in that group being "or"ed together. E.g., a key field tree for the protocol, one for domain, one for URL path, and so on. The final key field tree stores output values which identify policies for how to handle the client's request. The above methods can be applied to walk the key field trees using the information extracted from a given client request and arrive at an output value that dictates which policy to use.

More information about CDNs and content request handling systems and policies for handling content requests can be found in U.S. Pat. Nos. 10,257,318; 10,237,374; 10,237,363; 9,942,363; 9,736,271; 9,667,747; 9,654,579, the contents of all of which are hereby incorporated by reference in their entireties.

Exemplary Application to IP Address Blacklisting and/or Whitelisting

Another (non-limiting) application for the teachings hereof involves IP address whitelisting and/or blacklisting. IP Address whitelisting allows you to create a list of trusted IP Addresses. There are various mechanisms to store whitelisted IP addresses. One form is to store an IP Address in a list; a more efficient way is to store it in key-value store like Radix Tree. Storing a large number of IP addresses in Radix tree for blacklisting or whitelisting avoids duplication to some extent; however the approaches described here can efficiently store such IP addresses and reduces memory footprint by large margins above and beyond a Radix tree.

Consider an example of IP address whitelisting, where the following table expresses the set of IPv4 addresses that are stored in a whitelist, where each column below represents one octet of an IPv4 address.

| Key Field 1 (1st octet) | Key Field 2 (2nd octet) | Key Field 3 (3rd octet) | Final Key Field |
|---|---|---|---|
| 1 | 1 | 0 | 1\|2\|3\|6\|7\|8 |
| 1 | 1 | 1 | 1\|2\|3\|6\|7\|8 |
| 1 | 1 | 2 | 1\|2\|3 |
| 1 | 1 | 3 | 7\|8 |
| 1 | 2 | 1 | 1\|2\|3\|6\|7\|8 |
| 1 | 2 | 2 | 1\|7\|8 |
| 1 | 3 | 1 | 1\|3\|7\|8 |
| 1 | 3 | 0 | 1\|2\|3\|6\|7\|8 |
| 1 | 3 | 3 | 1\|2\|3\|6\|7\|8 |

Figure 10:
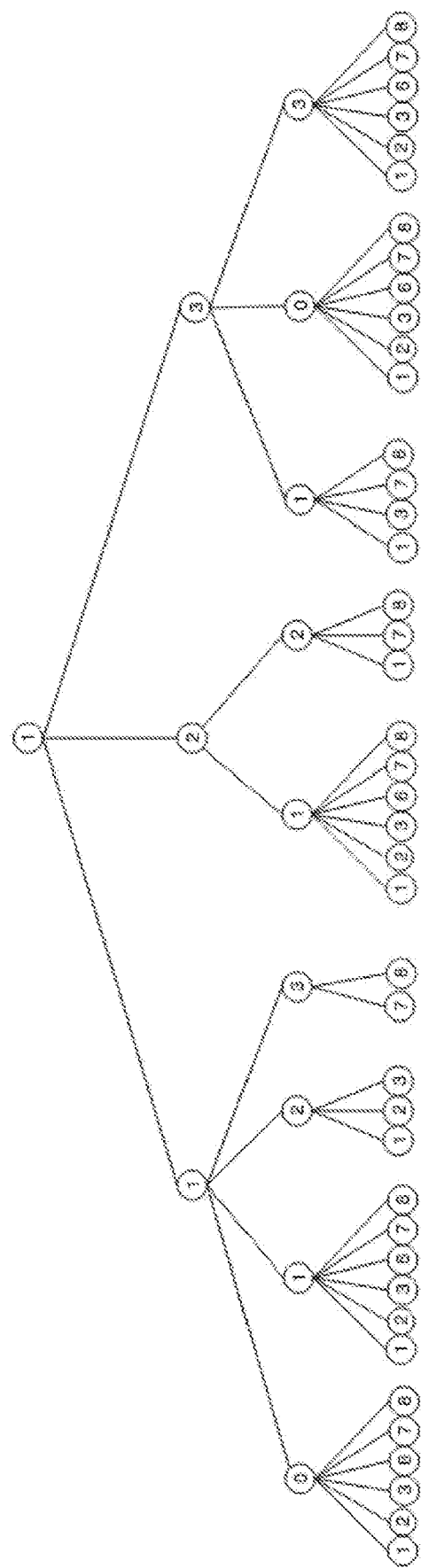
FIG. 10 shows a prior art radix tree for storing a set of keys related to an IP whitelist.

The prior art Radix tree storing this data set is shown in FIG. 10. As before, there are many redundant nodes.

Figure 11:
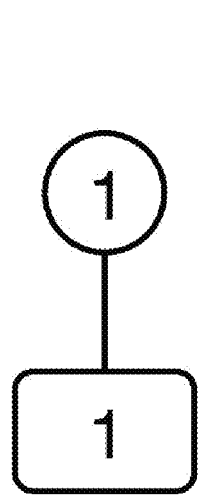
FIG. 11 is a tree for key field 1 of an improved data structure for storing the IP whitelist shown in FIG. 10.
Figure 14:
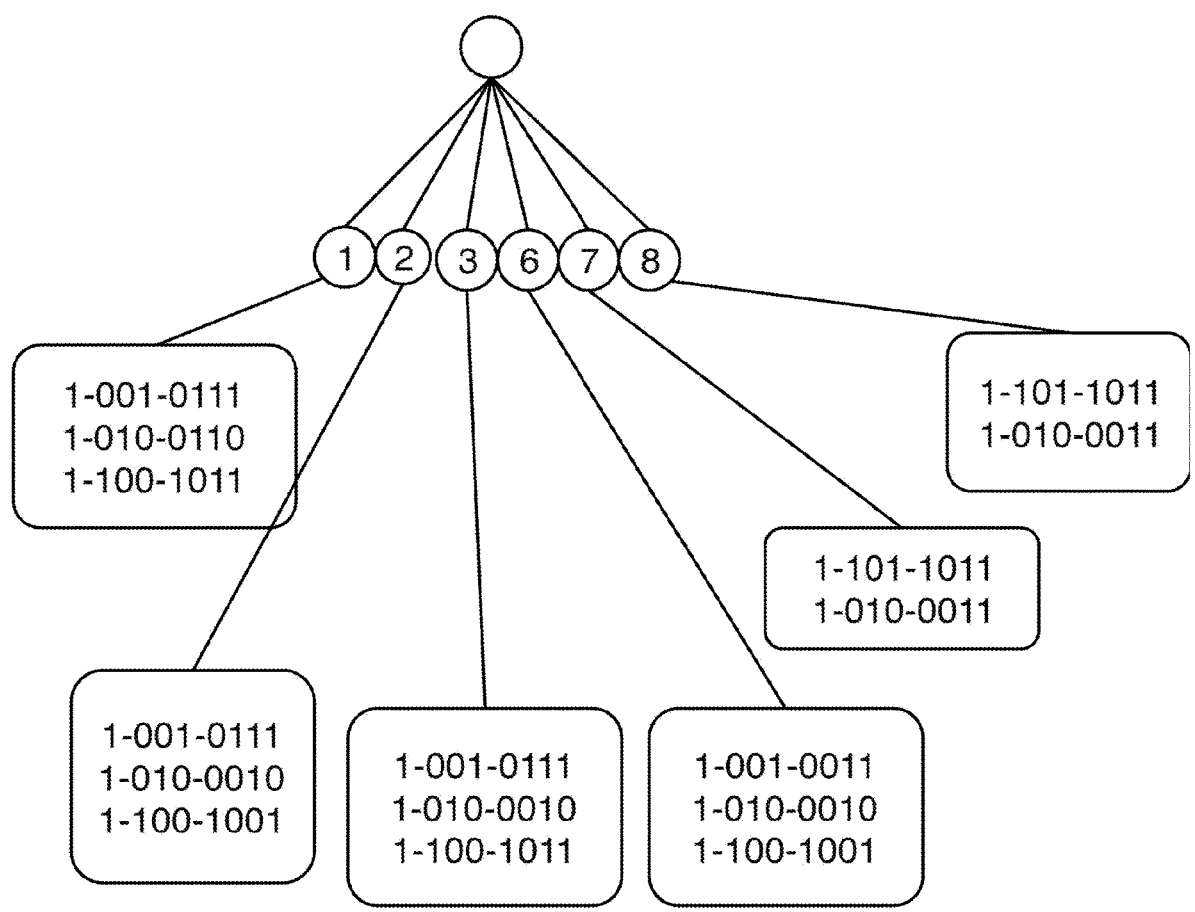
FIG. 14 is a tree for the last key field of an improved data structure for storing the IP whitelist shown in FIG. 10.

A data structure optimized according to the teachings hereof is shown in the key field trees of FIG. 11, 12, 13, with the final key field tree is shown in FIG. 14. In this example there are multiple bitmasks in each leaf node of the final key field tree leaf nodes. Each bitmask is checked to see if the bitmasks match.

Figure 12:
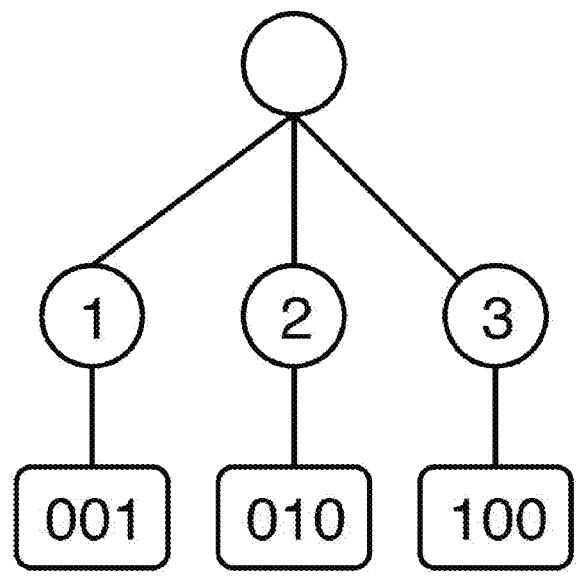
FIG. 12 is a tree for key field 2 of an improved data structure for storing the IP whitelist shown in FIG. 10.
Figure 13:
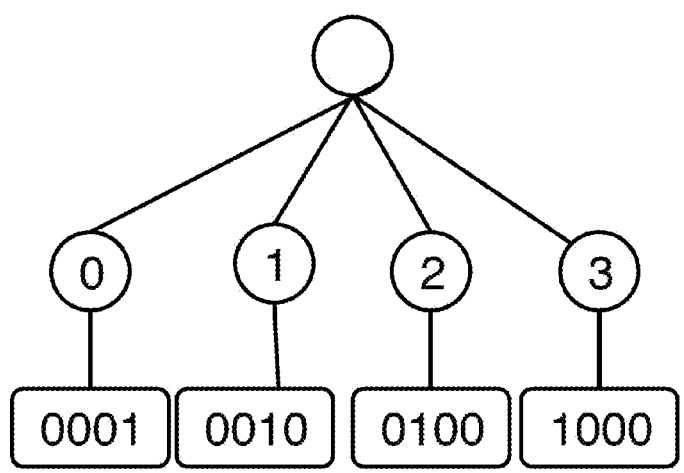
FIG. 13 is a tree for key field 3 of an improved data structure for storing the IP whitelist shown in FIG. 10.

Let's look at a lookup example for the IPv4 address 1.1.3.1, which is NOT a whitelisted IP address. The lookup for in FIGS. 11-13 produces a bit array (encoded identifier) of 1-001-1000. If we look at FIG. 14, the final key field tree for the last value of '1' as 1-001-00111 OR 1-010-110 OR 1-100-1010. The bit array does not match any of these, so this is not considered a trusted IP address according to the whitelist stored in this data structure. If the input key had been 1.3.3.1, then the bit array produced from FIGS. 11-13 lookup would be 1-100-1000, and the final lookup for the last key field of '1' in FIG. 14 would match against the validity bitmask of 1-100-1010, causing the tree to match the value, and thus return a "found" and the IP address would be trusted.

Calculating bit arrays (again, an example encoded identifier) and validity bitmasks for a non-leaf node is increased the value by power of 2 for each unique entry in the node at a given level. For a two level subtree there are three unique values 1, 2, 3 hence bit arrays for that is 001, 010, 100 respectively. Similarly a level three subtree has 0, 1, 2, 3 and its bit arrays are 0001, 0010, 0100, 1000. We know the size of the bit array and corresponding required bitmask for each subtree, thus it can use an exact number of bits for each subtree. In the example above, FIGS. 11-14, the validity bitmask size is 8 bits in total. The final bitmask can be stored in a byte.

A leaf node (or other terminal node) might need multiple bitmasks, as was the case in the example above. Now, let's take a look at how (in that example) the validity bitmasks can be calculated for each leaf node in the final key field tree of FIG. 14.

In general, the approach is to traverse the final key field tree and create validity bitmasks for each leaf node. For example, for leaf node 1 of the final key field, all the possible paths from prior key field trees and its bit arrays are:

| Path    | Bit Array  |
|---------|------------|
| 1.1.0.1 | 1-001-0001 |
| 1.1.1.1 | 1-001-0010 |
| 1.1.2.1 | 1-001-0100 |
| 1.2.1.1 | 1-010-0010 |
| 1.2.2.1 | 1-010-0100 |
| 1.3.1.1 | 1-100-0010 |
| 1.3.0.1 | 1-100-0001 |

The combined bit arrays for 1.1.*.* produce a bitmask of 1-001-0111 (obtained by the operation of 1-001-0001 OR 1-001-0010 OR 1-001-0100). The combined bit arrays for 1.2.*.* produce a bitmask of 1-010-0110 (obtained by the operation of 1-010-0010 OR 1-010-0100). The combined bit arrays for 1.3.*.* produce a bitmask of 1-100-1011 (obtained by the operation of 1-100-0010 OR 1-100-0001). Those bitmasks are accordingly the bitmasks shown in FIG. 14 for leaf node 1.

Now consider leaf node in the final key field tree for an octet of value 7. Applying the same approach, one arrives at

| Path    | Bit Array  |
|---------|------------|
| 1.1.0.7 | 1-001-0001 |
| 1.1.1.7 | 1-001-0010 |
| 1.1.3.7 | 1-001-1000 |
| 1.2.1.7 | 1-010-0010 |
| 1.2.2.7 | 1-010-0100 |
| 1.3.1.7 | 1-100-0010 |
| 1.3.0.7 | 1-100-0001 |
| 1.3.3.7 | 1-100-1000 |

And, the validity bitmasks are:
1.1.* with a bitmask 1-001-1011
1.2.* with a bitmask 1-010-0110
1.3.* with a bitmask 1-100-1011

Because the bitmasks for 1.1,* and 1.3.* are partially the same (both ending in 1011), these can be merged and results in just two validity bitmasks for leaf node 7 in FIG. 14:
1-101-1011
1-010-0110

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 15:
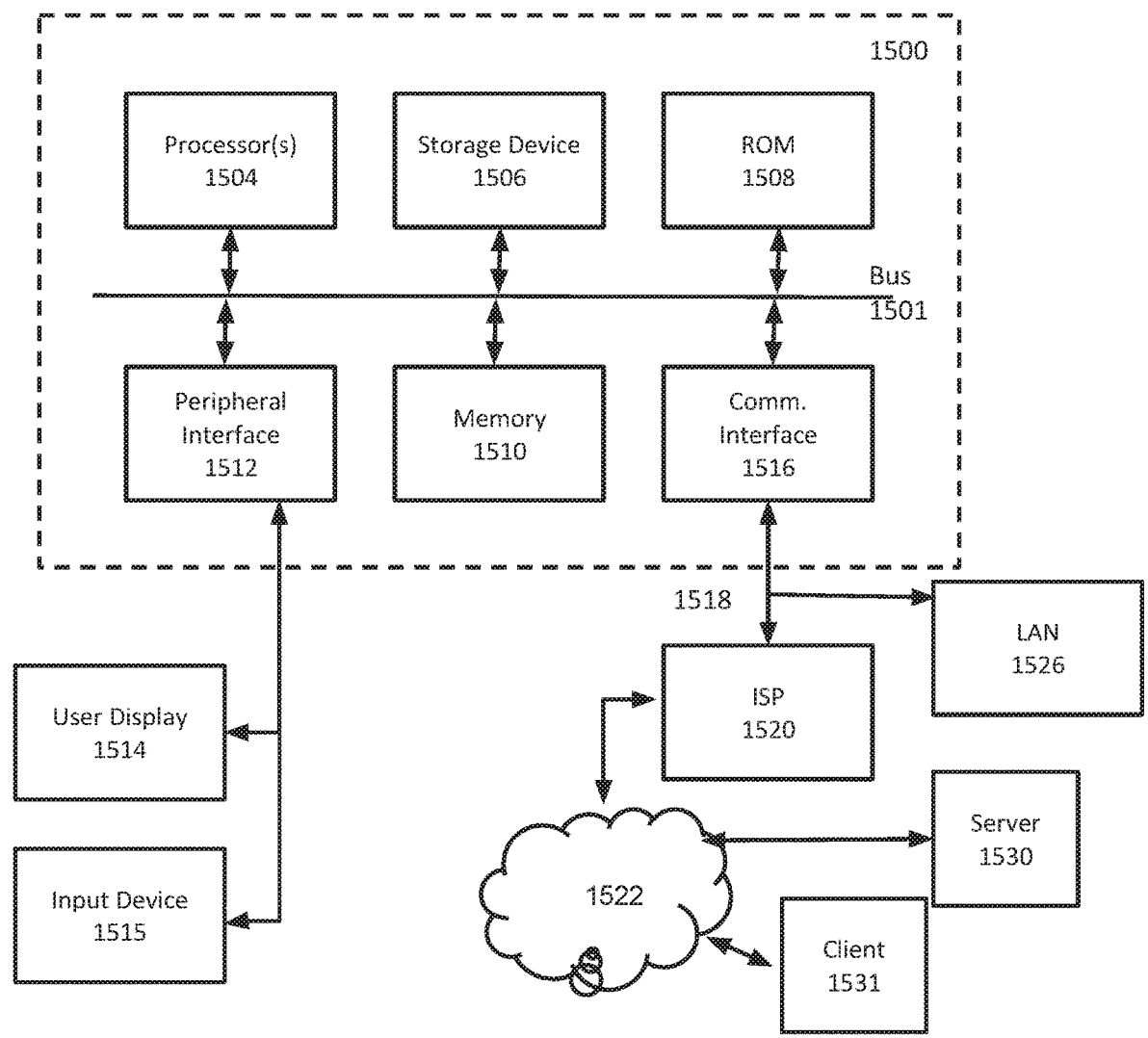
FIG. 15 is a block diagram illustrating hardware in a computer system that may be used to implement the teachings hereof.

FIG. 15 is a block diagram that illustrates hardware in a computer system 1500 upon which such software may run in order to implement embodiments of the invention. The computer system 1500 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 1500 includes a microprocessor 1504 coupled to bus 1501. In some systems, multiple processor and/or processor cores may be employed. Computer system 1500 further includes a main memory 1510, such as a random access memory (RAM) or other storage device, coupled to the bus 1501 for storing information and instructions to be executed by processor 1504. A read only memory (ROM) 1508 is coupled to the bus 1501 for storing information and instructions for processor 1504. A non-volatile storage device 1506, such as a magnetic disk, solid state memory (e.g., flash memory), or optical disk, is provided and coupled to bus 1501 for storing information and instructions. Other application-specific integrated circuits (ASICs), field programmable gate arrays (FPGAs) or circuitry may be included in the computer system 1500 to perform functions described herein.

A peripheral interface 1512 may be provided to communicatively couple computer system 1500 to a user display 1514 that displays the output of software executing on the computer system, and an input device 1515 (e.g., a keyboard, mouse, trackpad, touchscreen that communicates user input and instructions to the computer system 1500. However, in many embodiments, a computer system 1500 may not have a user interface beyond a network port, e.g., in the case of a server in a rack. The peripheral interface 1512 may include interface circuitry, control and/or level-shifting logic for local buses such as RS-485, Universal Serial Bus (USB), IEEE 1394, or other communication links.

Computer system 1500 is coupled to a communication interface 1516 that provides a link (e.g., at a physical layer, data link layer,) between the system bus 1501 and an external communication link. The communication interface 1516 provides a network link 1518. The communication interface 1516 may represent an Ethernet or other network interface card (NIC), a wireless interface, modem, an optical interface, or other kind of input/output interface.

Network link 1518 provides data communication through one or more networks to other devices. Such devices include other computer systems that are part of a local area network (LAN) 1526. Furthermore, the network link 1518 provides a link, via an internet service provider (ISP) 1520, to the Internet 1522. In turn, the Internet 1522 may provide a link to other computing systems such as a remote server 1530 and/or a remote client 1531. Network link 1518 and such networks may transmit data using packet-switched, circuit-switched, or other data-transmission approaches.

In operation, the computer system 1500 may implement the functionality described herein as a result of the processor executing code. Such code may be read from or stored on a non-transitory computer-readable medium, such as memory 1510, ROM 1508, or storage device 1506. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 1518 (e.g., following storage in an interface buffer, local memory, or other circuitry).

It should be understood that e foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, given the nature of the subject matter at issue, and not to imply endorsement or affiliation in any way.

The invention claimed is:

1. A method for, given an input key, performing a lookup in a data structure to locate an output value, the data structure having a plurality of trees, the method comprising:
    establishing a first tree of the data structure associated with a first field of the input key;
    establishing a final tree of the data structure associated with both a final field of the input key and with one or more output values;
    the lookup comprising:
        searching the first tree for a value of the first field of the input key, to locate a matching first key field value and a first encoded identifier associated therewith;
        searching the final tree for a value of the final field of the input key, to locate a matching final key field value associated with the one or more output values, each of which is associated with a designation of valid first key field values; and,
        based at least in part on the designation of valid first key field values, determining whether the first encoded identifier for the matching first key field value is valid for any of the one or more output values, wherein:
            (i) following a determination that the first encoded identifier is valid for a particular output value of the one or more output values, returning the particular output value as a result of the lookup in the data structure with the input key; and
            (ii) following a determination that the first encoded identifier is not valid for any of the one or more output values, returning an indication that the input key was not found in the data structure.

2. The method of claim 1, further comprising:
    providing a second tree in the data structure that is associated with a second field of the input key located in between the first and final fields;
    searching the second tree for a value of the second field of the input key, to locate a matching second key field value and a second encoded identifier associated therewith;
    wherein, in the final tree, each of the one or more output values is further associated with a second designation of valid second key field values; and,
    based at least in part on the designation of valid first key field values and the second designation of valid second key field values, determining whether the first and second encoded identifiers for the matching first and second key field values, respectively, are valid for any of the one or more output values, wherein:
        (i) following a determination that both first and second encoded identifiers are valid for a particular output value of the one or more output values, returning the particular output value as a result of the lookup in the data structure with the input key; and
        (ii) following a determination that either of the first and second encoded identifiers are not valid for any of the one or more output values, returning an indication that the input key was not found in the data structure.

3. The method of claim 2, wherein the input key comprises any of: (i) a number and (ii) a string, the value of the first field of the input key comprising any of: one or more characters in the string.

4. The method of claim 3, wherein the value of the second field of the input key comprises one or more characters in the string immediately after the first field of the input key.

5. The method of claim 4, wherein the value of the final field of the input key comprises one or more characters at the end of the string.

6. The method of claim 2, wherein the first and second encoded identifiers each comprise a bit being set in a bit array.

7. The method of claim 2, wherein both the first and second designations comprise bitmasks.

8. The method of claim 1, wherein the input key comprises any of:
    an HTTP request header;
    an HTTP method;
    at least a portion of a URL; and
    a hostname.

9. The method of claim 2, wherein any of the one or more output values represents a policy identifier pointing to a policy for handling a client request.

10. The method of claim 2, wherein the matching values of any of first, second and final key fields are alternative values stored according to an 'or' condition.

11. The method of claim 1, wherein the input key comprises an IP address.

12. An apparatus comprising circuitry forming one of more processors and memory holding computer program instructions for execution on the one or more processors, the computer program instructions comprising instructions for:
    providing a data structure that enables the apparatus to perform a lookup in the data structure to locate an output value when given an input key, the data structure having a plurality of trees comprising:
a first tree of the data structure associated with a first field of the input key;
a final tree of the data structure associated with both a final field of the input key and with one or more output values;
the lookup comprising:
searching the first tree for a value of the first field of the input key, to locate a matching first key field value and a first encoded identifier associated therewith;
searching the final tree for a value of the final field of the input key, to locate a matching final key field value associated with the one or more output values, each of which is associated with a designation of valid first key field values; and,
based at least in part on the designation of valid first key field values, determining whether the first encoded identifier for the matching first key field value is valid for any of the one or more output values, wherein:
(i) following a determination that the first encoded identifier is valid for a particular output value of the one or more output values, returning the particular output value as a result of the lookup in the data structure with the input key;
(ii) following a determination that the first encoded identifier is not valid for any of the one or more output values, returning an indication that the input key was not found in the data structure.

\* \* \* \* \*